(12) United States Patent
Kapuria et al.

(10) Patent No.: US 11,052,921 B2
(45) Date of Patent: Jul. 6, 2021

(54) SYSTEM AND METHOD FOR ENGAGING A DRIVER DURING AUTONOMOUS DRIVING MODE

(71) Applicant: THE HI-TECH ROBOTIC SYSTEMZ LTD, Haryana (IN)

(72) Inventors: Anuj Kapuria, Haryana (IN); Ritukar Vijay, Haryana (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 0 days.

(21) Appl. No.: 16/729,294

(22) Filed: Dec. 27, 2019

(65) Prior Publication Data

US 2020/0207366 A1 Jul. 2, 2020

(30) Foreign Application Priority Data

Dec. 28, 2018 (IN) .............................. 201811049551

(51) Int. Cl.
  *B60W 50/14* (2020.01)
  *B60W 40/09* (2012.01)
  *B60W 50/08* (2020.01)
  *G05D 1/00* (2006.01)

(52) U.S. Cl.
  CPC ............ *B60W 50/14* (2013.01); *B60W 40/09* (2013.01); *B60W 50/082* (2013.01); *G05D 1/0061* (2013.01); *G05D 1/0088* (2013.01); *G05D 2201/0213* (2013.01)

(58) Field of Classification Search
  CPC .... B60W 50/14; B60W 40/09; B60W 50/082; G05D 1/0088; G05D 1/0061; G05D 2201/0213
  USPC .... 340/439, 901, 905, 907, 425.5, 438, 457, 340/539.1, 539.22, 539.25
  See application file for complete search history.

(56) References Cited

U.S. PATENT DOCUMENTS

| | | | | |
|---|---|---|---|---|
| 10,144,408 | B2* | 12/2018 | Theodosis | .......... G06K 9/00845 |
| 2014/0222280 | A1* | 8/2014 | Salomonsson | ......... B60Q 9/008 |
| | | | | 701/28 |
| 2017/0043715 | A1* | 2/2017 | Osugi | ..................... G06F 3/013 |
| 2017/0351812 | A1* | 12/2017 | Green | .................... G16B 40/00 |
| 2020/0216078 | A1* | 7/2020 | Katz | ...................... G06F 3/017 |

* cited by examiner

*Primary Examiner* — Daryl C Pope

(57) ABSTRACT

The present subject matter relates to a method and system maintaining driver alertness while driving mode of a vehicle is changed from manual to autonomous driving mode. The system includes a monitoring module to detect a transition from a manual drive mode to an autonomous drive mode. Based on this, a driver monitoring module gets activated. The driver monitoring module once activated, monitors the driver alertness during the autonomous drive mode. The system further includes an interactive module, which is connected to the monitoring module that gets activated in case alertness level of the driver falls below a first threshold value. The first threshold value may be determined based on multiple attributes. Further, the interactive training program is deactivated if the alertness of the driver is equal or greater than a second threshold value.

16 Claims, 8 Drawing Sheets

SYSTEM AND METHOD FOR ENGAGING A DRIVER DURING AUTONOMOUS DRIVING MODE

CROSS REFERENCE TO RELATED APPLICATIONS

The present application claims the benefit of Indian Patent Application No. 201811049551 filed on Dec. 28, 2018. All the above are hereby incorporated by reference. the contents of which are incorporated herein by reference in their entirety.

FIELD OF INVENTION

The present invention relates to autonomous driving vehicles and more particularly related to maintaining driver alertness while driving mode of a vehicle is changed from manual to autonomous driving mode, wherein the driver alertness is maintained by providing an interactive training program.

BACKGROUND OF THE INVENTION

Modern day vehicle technology is advancing towards higher degree of autonomous ability. Autonomous vehicles are defining a new era in modern day transportation. Autonomous vehicles either require minimum or no intervention from its driver. There are some autonomous vehicles that may only require an initial input from the driver, whereas some other designs of the autonomous vehicles are continuously under control of the driver. There are some autonomous vehicles that can be remotely controlled. For example, automatic parking in vehicles is an example of the autonomous vehicle in operation. According to the Society of Automotive Engineers (SAE) cars and vehicles in general are classified into 5 different classifications:

Level 0: Automated system has no vehicle control, but may issue warnings.

Level 1: Driver must be ready to take control at any time. Automated system may include features such as Adaptive Cruise Control (ACC), Parking Assistance with automated steering, and Lane Keeping Assistance (LKA) Type II in any combination.

Level 2: The driver is obliged to detect objects and events and respond if the automated system fails to respond properly. The automated system executes accelerating, braking, and steering. The automated system can deactivate immediately upon takeover by the driver.

Level 3: Within known, limited environments (such as freeways), the driver can safely turn their attention away from driving tasks, but must still be prepared to take control when needed.

Level 4: The automated system can control the vehicle in all but a few environments such as severe weather. The driver must enable the automated system only when it is safe to do so. When enabled, driver attention is not required.

Level 5: Other than setting the destination and starting the system, no human intervention is required. The automatic system can drive to any location where it is legal to drive and make its own decisions.

Autonomous vehicles of Level 3 and onwards let the driver to take away their attention from the vehicle. However, autonomous vehicles face dynamic environment that is the environment keeps changing every time. The autonomous vehicles need to keep a track of lane markings, road edges, track road curves, varying surfaces that may be include flat surfaces, winding roads, hilly roads etc. Alongside, the autonomous vehicles also need to keep a check on objects that are both stationary or mobile like a tree or a human or an animal. While such autonomous vehicles relieve the driver of routine tasks, the vehicle driver may perceive his driving activity to be monotonous due to this relief, and may possibly be no longer attentive to the degree that is required for safe control of the motor vehicle in certain situations.

Therefore, there is a need of an efficient system for maintaining driver attentiveness even while the driver is not participating in the controlling of the vehicle.

SUMMARY OF THE INVENTION

According to an embodiment of the invention, there is provided a system for engaging a driver during an active autonomous drive mode within a vehicle. The system includes a drive mode monitoring module that is configured to detect a transition from a manual drive mode to an autonomous drive mode. Based on this, a driver monitoring module gets activated. The driver monitoring module once activated then it monitors the driver alertness during the autonomous drive mode. The system further includes an interactive module, that is connected to all monitoring modules that get activated training in case the alertness level of the driver falls below a first threshold value. The first threshold value may be determined based on a plurality of attributes. These multiple attributes may be dependent on the condition of the road being traversed by the vehicle, traffic conditions surrounding the vehicle and may be upcoming as well and other atmospheric conditions like lighting conditions, rain, etc.

The system may also be a device with all the modules, as mentioned in the system.

Further, the interactive module is configured to initiate an interactive training program for the driver, wherein the interactive training program is designed for enhancing driving shortcomings of the driver that have been identified by the interactive module. The shortcomings of the driver are determined based on a comparison between driving behavior of the driver, that is continuously monitored, and optimal driving behavior corresponding to other drivers stored in a database.

Furthermore, the interactive module could be designed for enhancing traffic rule knowledge of the driver. The traffic rule knowledge of the driver is determined based on violations of traffic rules by the driver in the past or by other vehicle drivers in general which are determined by the processing module along with other related traffic rules.

The interactive module could also be designed for enhancing vehicle operation error knowledge of the driver. The vehicle operation error rule knowledge of the driver is determined based on vehicle operational issues faced by the driver in the past or by other vehicle drivers in general.

According to another aspect of the invention, there is provided a method for engaging a driver during an autonomous drive mode. The method includes detecting a transition from a manual drive mode to an autonomous drive mode through a drive mode monitoring module; the method further includes monitoring driver alertness during the autonomous drive mode using driver monitoring module; activating an interactive training program through an interactive module, in case alertness of the driver falls below a first threshold value wherein the first threshold value for alertness is determined based on plurality of attributes. Further, the first threshold value may be determined based on a plurality of attributes. These multiple attributes may be dependent on the condition of the road being traversed by the vehicle, traffic conditions surrounding the vehicle and may be upcoming as well and other atmospheric conditions like lighting conditions, rain, etc. Further, the interactive training program enhances driving shortcomings, traffic rule knowledge and vehicle operation error knowledge of the driver.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings.

BRIEF DESCRIPTION OF ACCOMPANYING DRAWINGS

The foregoing summary, as well as the following detailed description of various embodiments, is better understood when read in conjunction with the drawings provided herein. For the purpose of illustration, there are shown in the drawings exemplary embodiments; however, the presently disclosed subject matter is not limited to the specific methods and instrumentalities disclosed.

DETAILED DESCRIPTION OF INVENTION

Figure 1:
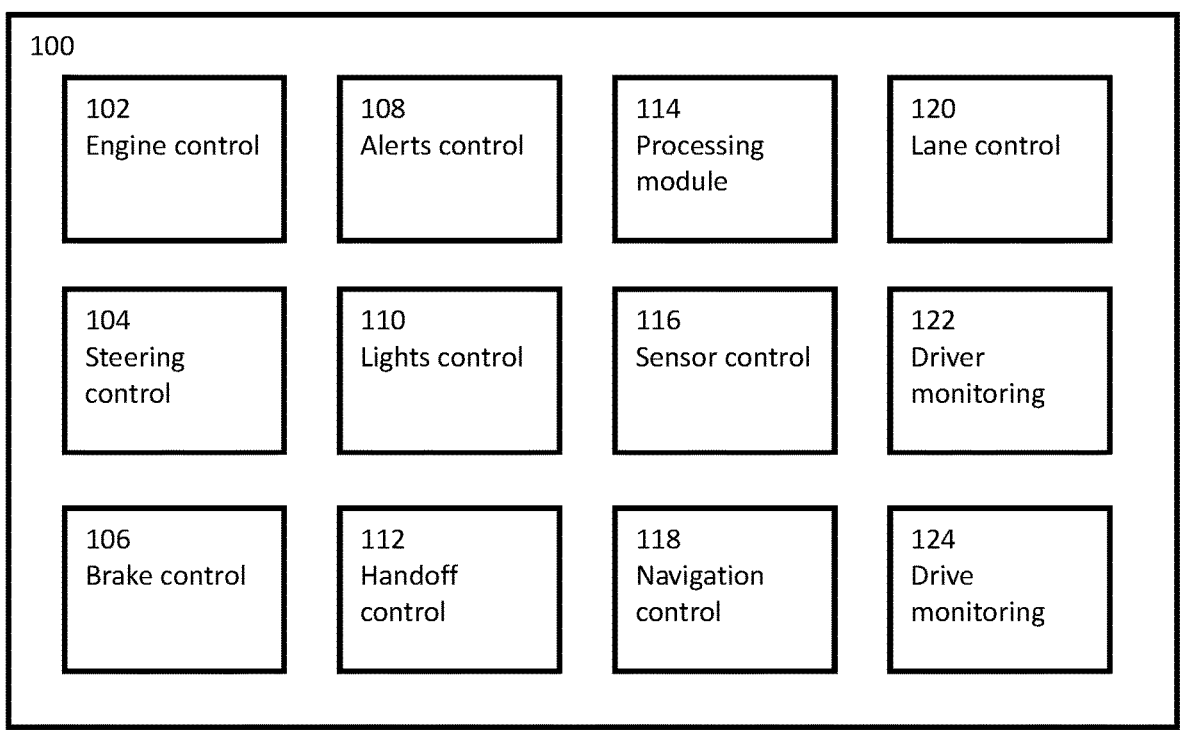
FIG. 1 is a block diagram of an autonomous vehicle and its subsystems, in accordance with an embodiment of the invention.

FIG. 1 shows a block diagram of an autonomous vehicle 100 (termed as vehicle 100 interchangeably within the description) and its various subsystems, in accordance with an embodiment of the invention. According to an embodiment of the invention, the autonomous vehicle 100 may be a fully or a semi-autonomous vehicle. The autonomous vehicle 100 includes multiple sub systems to control various important processes and functions. The autonomous vehicle 100 may include Engine control module 102, Steering control module 104, Brake control module 106, Alerts control module 108, Lights control module 110, Handoff control module 112, Processing module 114, Sensor control module 116, Navigation control module 118, Lane control module 120, Driver monitoring module 122, and Drive mode monitoring module 124.

Engine control module 102 controls various functions and processes of an engine of the vehicle 100. Functions and processes to be controlled may be speed of rotation, engine condition, servicing requirements, load on engine, power of engine, etc.

Steering control module 104 may help in movement of the vehicle 100. The steering control module 104 helps vehicle 100 to be driven and controlled in transverse and longitudinal direction. Steering control module 104 may include actuators that may control the steering control module 104 in autonomous mode.

Brake control module 106 of the autonomous vehicle 100 may help in braking function of the vehicle 100. Brake control module 106 may control brakes of all four wheels using disc or horse-shoe brake parts. The brake control module 106 may also include actuators connected to brake parts in order to control braking while in autonomous drive mode.

Alerts control module 108 may control various alerts to be provided during various situations. The alerts may include ranging from servicing requirement of the vehicle 100 to lane change assist alerts during manual and autonomous mode.

Lights control module 110 may control various lighting functions of the vehicle 100. The lighting functions may be for example, switching on lights while ambient light is below a threshold or changing low beam to high beam while road is empty and high beam is required due to night lighting conditions on road.

Handoff control module 112 takes care of drive handling control of the vehicle 100. The handoff control module 112 may be responsible for switching control of the vehicle 100 to autonomous from manual or vice versa. The handoff control module takes over full control function of the vehicle 100 while switching to autonomous mode.

Processing module 114 provides computing power to the vehicle 100. The processing module 114 helps the vehicle 100 in all the calculations required for autonomous, or semi-autonomous driving modes as well. It may also be useful in manual driving mode as well wherein the processing module 114 may process route calculations, fuel requirements, etc. In autonomous mode, the processing module 114 may take in data from various sensors and use the sensor data for efficient drive control during autonomous drive mode.

Sensor control module 116 collects data from the physical sensors provided all over the vehicle 100. The sensors may be RADAR sensors, ultrasonic sensors, LiDAR sensor, proximity sensors, weather sensors, heat sensors, tire pressure sensors, etc. the sensor control module 116 in association with the processing module 114 may also calibrate the sensors regularly due to dynamic environment around the vehicle 100.

Navigation control module 118 helps the autonomous vehicle 100 during active autonomous drive mode in navigation. In general, the navigation control module 118 may include route calculation, maps, road sign identification etc. for efficient navigation of the vehicle 100.

Lane control module 120 may help the vehicle 100 to control lane changing and drive within a lane as marked on the road. Lane control module 120 may be take input data from image and RADAR sensors to identify lanes and help the vehicle to change lanes during an active autonomous drive mode.

Driver monitoring module 122 collects data about driver during an active autonomous drive mode, semiautonomous mode and manual mode. It collects data about driver like face expressions, eye gaze, emotions, facial identity etc. Data about driver may be collected using various cameras facing into a cabin of the vehicle 100.

Drive monitoring module 124 collects data about drive of the vehicle 100. The drive may be autonomous drive or manual drive. Data collected may be like drive behavior in various situations, various conditions, confidence level, stress induced mistakes etc. Drive monitoring module 124 may help in ascertaining drive behavior during the drive that may be kept for records and utilized for improving future drive interactions, and mistakes while driving the vehicle 100.

It is to be noted, that the vehicle 100 may further include some more modules that may help in functioning of the vehicle 100 and some modules as mentioned above may be combined together to perform similar functions.

Figure 2A:
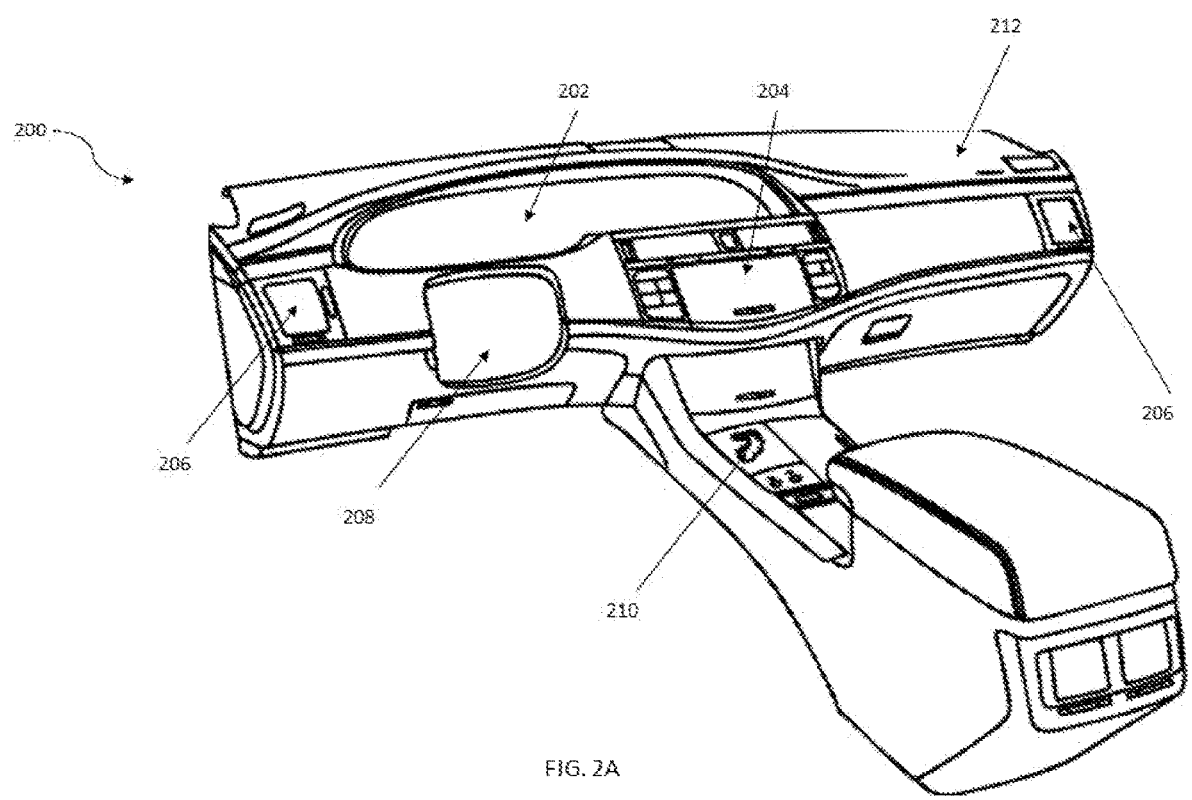
FIG. 2A is a line diagram of a vehicle dashboard, in accordance with an embodiment of the invention.

FIG. 2A is a line diagram of a dashboard 200 of a vehicle, in accordance with an embodiment of the invention. The dashboard 200 includes an instrument cluster 202, an infotainment system 204, Air conditioning vents 206, steering space 208, and a central console 210.

The instrument cluster 202 may include indicators (not shown in figure) for speed, distance, rotations per minute, fuel indications, heating indications, etc. The infotainment system 204 provides various entertainment features like music system, navigation, various alerts, etc. to the driver of the vehicle. Air conditioning vents 206 may be provided in order to control climate of a cabin of the vehicle. As depicted, there may be multiple air conditioning vents provided within the dashboard 200. The dashboard 200 may also include a steering space 208 wherein steering wheel of the vehicle is accommodated. Further, there may also be provided a central console 210 for driver's use like storage, bottle holders, etc.

Figure 2B:
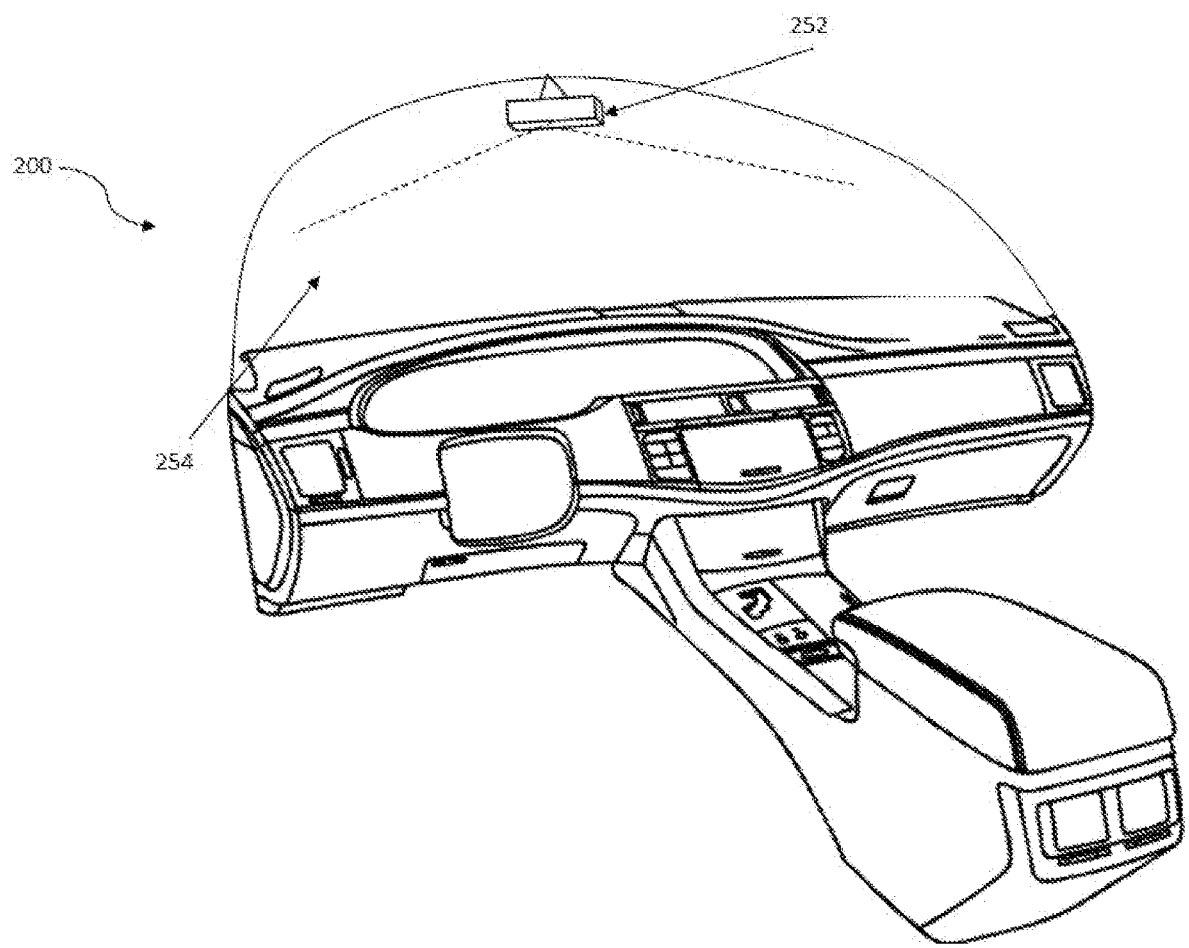
FIG. 2B is a line diagram of a vehicle interior with a projection module, in accordance with an embodiment of the invention.

FIG. 2B is a line diagram of the dashboard 200 of the vehicle including a projection module 252 placed near roof of the vehicle 100 in accordance with an embodiment of the invention. The projection module 252, may be configured to display an interactive heads up display on the windscreen 254. The projection module 252 is connected to a training module 312 (to be described later) and a user device (not shown in the figure) through wireless connection like PAN etc.

The projection module 252 may display the interactive training program on the windscreen 254 fully or partially. Some portion of the windscreen may be configured to provide certain notifications to the driver for example, milestone of distance achieved, economy of the car for last 1 hour of drive, fuel level, etc. The projected visual is interactive and may be interacted by simply touching the air space of the visual. The projection module 252 determines the various hand and finger gestures to determine input gestures of the driver. In another embodiment of the invention, the user device connected with the projection module 252 may be utilized as a remote control to provide inputs of the driver.

In another embodiment of the invention, the projection may also be provided on a side of the windscreen so as not to obstruct driver's field view. The projection may be configured in a holographic manner and in a see-through fashion that does not hinder the view of the surrounding around the vehicle for the driver.

For example, the projection may be in a small 7-inch display on the left bottom of the windscreen. Such a size will enable the driver to interact as well as keep an eye on the road for emergency situations. The projections may be HD or non-HD projections to take care of non-obstruction of the surrounding view.

According to an embodiment of the invention, the projection module 252 may be configured to report an upcoming event to which the driver must pay special attention to or be ready to intervene in. For example, crowded place notification etc.

According to yet another embodiment of the invention, the projection module 252 may also be configured to remove the heads-up display in a situation wherein intervention of the driver may be required at appropriate time. or, the heads-up display may be reduced to a smaller part of the windscreen with small notifications to the driver.

In an embodiment of the invention, the projection module 252 may be a standalone device capable of gathering information about the exterior of the vehicle, the interior of the vehicle, projection of information on the windscreen 254 etc.

Figure 3A:
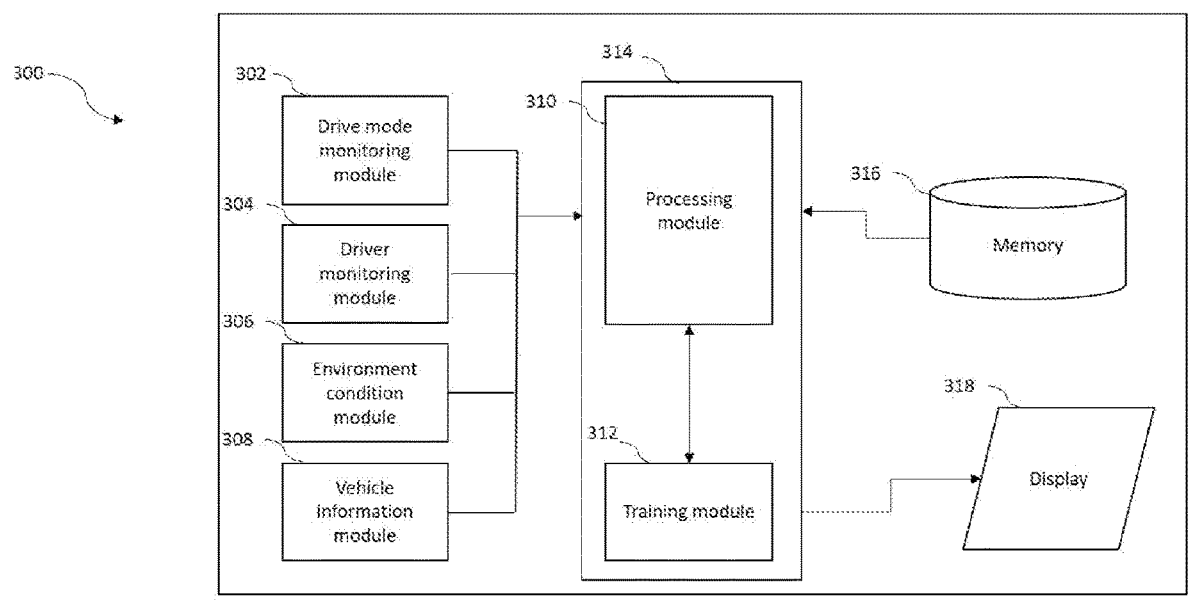
FIG. 3A is a block diagram of a system for engaging driver, in accordance with an embodiment of the invention.

FIG. 3A is a block diagram of a device 300 for engaging a driver during an active autonomous mode, in accordance with an embodiment of the invention. The device 300 may include multiple modules like a drive mode monitoring module 302; a driver monitoring module 304; an environment condition module 306; a vehicle information module 308; an interactive module 314 which includes, a processing module 310, a training module 312; a memory 316, and a display 318. The system may also be a device with all modules, as mentioned above in the system.

In an implementation, some of the modules such as the drive mode monitoring module 302, the driver monitoring module 304, the environment condition module 306, the vehicle information module 308, the processing module 310, the training module 312 may include routines, programs, objects, components, data structure and the like, which perform particular tasks or implement particular abstract data types. The modules may further include modules that supplement applications on the processing module 310, for example, modules of an operating system. Further, the modules may be implemented in hardware, instructions executed by a processing unit, or by a combination thereof.

In another aspect of the present subject matter, the modules may be machine-readable instructions which, when executed by a processor/processing module, perform any of the described functionalities. The machine-readable instructions may be stored on an electronic memory device, hard disk, optical disk or other machine-readable storage medium or non-transitory medium. In an implementation, the machine-readable instructions may also be downloaded to the storage medium via a network connection.

Memory 316 may be without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Drive mode monitoring module 302 determines, the active driving mode. Driving mode may be manual, semi-autonomous or autonomous. The drive mode monitoring module 302 may accept input from user to activate any of the three drive modes. The drive mode monitoring module 302 may be a touch button or a physical button or the like.

A driver may provide input to the drive mode monitoring module 302 to initiation of the driving mode as required by the driver.

Driver monitoring module 304 is positioned to face the driver of a vehicle and monitors presence of the driver. The driver monitoring module 304 may be a combination of image sensors, occupancy sensors, thermal sensors etc. In operation, the driver monitoring module 304 may sense presence or absence of the driver. The driver's presence may be determined using techniques like motion detection, occupancy sensing, thermal vision etc. The driver monitoring module 304, extracts attributes of the driver, once it is established that the driver is present, within the vehicle to identify the driver. Extracted attributes may include, but not limited to a facial scan, a retinal scan, thermal signatures, a fingerprint scan etc. In another example, the user's picture may be taken by the driver monitoring module 304. In yet another example, the driver's driving behavior may be used as an attribute.

The environment condition module 306 acquires information from nearby surroundings of the vehicle. Various sensors, like RADAR, LiDAR, image sensors, ultrasonic sensors, infrared sensors, rain sensors, may be employed within the environment condition module 306. Information like traffic, lane markings, pavement, road signs, position of the vehicle with respect to surroundings, other objects around the vehicle, upcoming bad road conditions, vehicle to server communication, vehicle to vehicle communication etc. may be collected by the environment condition module 306.

The vehicle information module 308 acquires information regarding speed of the vehicle, or position of the vehicle, etc. Position of the vehicle may be sensed using a Global Positioning system (GPS) whereas speed may be ascertained by utilizing speed sensors affixed on the vehicle.

The interactive module 314 includes processing module 310 and training module 312. The interactive module 314 is configured to initiate an interactive training program for the driver which is connected to the monitoring modules that gets activated the training in case alertness level of the driver falls below a first threshold value.

The processing module 310 gathers information from the drive mode monitoring module 302, the driver monitoring module 304, the environment condition module 306 and the vehicle information module 308 and processes the information for further usage. The processing module 310 processes information and determines whether to activate the training module 312 or not. The activation is determined on the information received from the driver monitoring module 304 and the drive mode monitoring module 302. If the drive mode is autonomous drive mode, and the driver's attentive level is below a first threshold level the processing module 310 activates the training module 312. The first threshold level may be preset or may be varied by the processing module 310 based on the environment information, and the vehicle information received from the environment condition module 306, and the vehicle information module 308 respectively. For example, in case of an empty road, good road conditions, and average speed of the vehicle, the threshold level for attentiveness may be lowered however, in a situation wherein there is traffic, speed of the vehicle is over average speed of surrounding cars, road conditions not good, or weather conditions not favorable for driving the threshold level may then be lowered dynamically in anticipation of avoiding a mishap. Furthermore, in event of driver alertness level being more than a second threshold level, the processing module 310 may send deactivation instructions to the training program.

According to an embodiment of the invention, the processing module 310, may further define driving behavior of the driver by using the driver monitoring module 304, the environment condition module 306, and the vehicle information module 308. For example, the processing module 310 may utilize the driver emotions while driver captured by the driver monitoring module 304 corresponding to an event within the surrounding like sudden braking by a car in-front captured by the environment condition module 306, or speed of the vehicle gathered by the vehicle information module 308. The processing module 310 may also continuously monitor and compares the driving behavior of the driver with average or good driving behavior classified of drivers of other vehicles connected and stored in a central server accessible to the processing module 310 when the device 300 is connected to the central server (described later in detail). The processing module 310, after comparison, may identify shortcomings of the driver and may prepare a training program for the driver.

According to another embodiment of the invention, the processing module 310, may further define driving behavior of the driver by using the driver monitoring module 304, the environment condition module 306, and the vehicle information module 308. For example, the processing module 310 may utilize the driver emotions while driver captured by the driver monitoring module 304 corresponding to an event within the surrounding like sudden braking by a car in-front captured by the environment condition module 306, or speed of the vehicle gathered by the vehicle information module 308. The processing module 310 may also continuously monitor and determine the driving behavior with respect to following of traffic rules that is also stored in a central server accessible to the processing module 310 when the device 300 is connected to the central server (described later in detail). The processing module 310, after determination, may identify traffic rules violated by the driver and may prepare a training program for the driver for the identified violated traffic rules and other related traffic rules as well.

According to yet another embodiment of the invention, the processing module 310, may further define driving behavior of the driver by using the driver monitoring module 304, the environment condition module 306, and the vehicle information module 308. For example, the processing module 310 may utilize the driver emotions while driver captured by the driver monitoring module 304 corresponding to an event within the surrounding like sudden braking by a car in-front captured by the environment condition module 306, or speed of the vehicle gathered by the vehicle information module 308. The processing module 310 may also continuously monitor and determine the driving behavior with respect to following of traffic rules that is also stored in a central server accessible to the processing module 310 when the device 300 is connected to the central server (described later in detail). The processing module 310, after determination, may identify various vehicle operation errors faced by the driver and may prepare a training program for the driver to enhance knowledge of the driver about various operational errors and issues that may have been faced by the driver in the past. Further, the interactive training may include small video tutorials to overcome various operational issues indicated by various signs to the driver.

The training module 312, receives activation or deactivation instructions from the processing module 310. The training module 312, on activation may connect to the memory 316 for fetching an interactive training program designed specifically for the driver of the vehicle. The training program may specifically have a list of questions, with multiple choice answers, for the driver. In another embodiment, the training may be in graphical form or video tutorials. The list of questions may be based upon shortcomings of the driver as identified by the processing module 310. The training program may be displayed to the driver through the display 318 that may be a screen of an infotainment system of the vehicle. The display 318 may be configured to receive inputs of the driver. The inputs may be through a touch, physical button, a remote control, voice input, or gesture recognition. The display 318 may include a circuitry (not shown in figure) like a printed circuit board (PCB) or an integrated circuit containing appropriate components for receiving and recognizing the driver inputs.

Simultaneously, with providing the training program to the driver, the processing module 310 continuously gather the data of driver monitoring modules to monitor the attentiveness level of the driver. In case the attentiveness level of the driver is still continuously below the first threshold level, as defined by the processing module 310, the vehicle is brought to a halt. However, in case the attentive level is above the second threshold level that is predefined only, the training program may be terminated, or some entertainment program may be displayed.

The driver may receive points for the inputs made in the training program that may be further used to provide incentives in insurance etc. the driver may also be ranked in a leaderboard based on his score. If the driver is provided with a training program and he still does not provide any input a warning may be provided to halt the vehicle. In case, the driver still does not provide any input for a predetermined time, the vehicle may be brought to a halt.

Figure 3B:
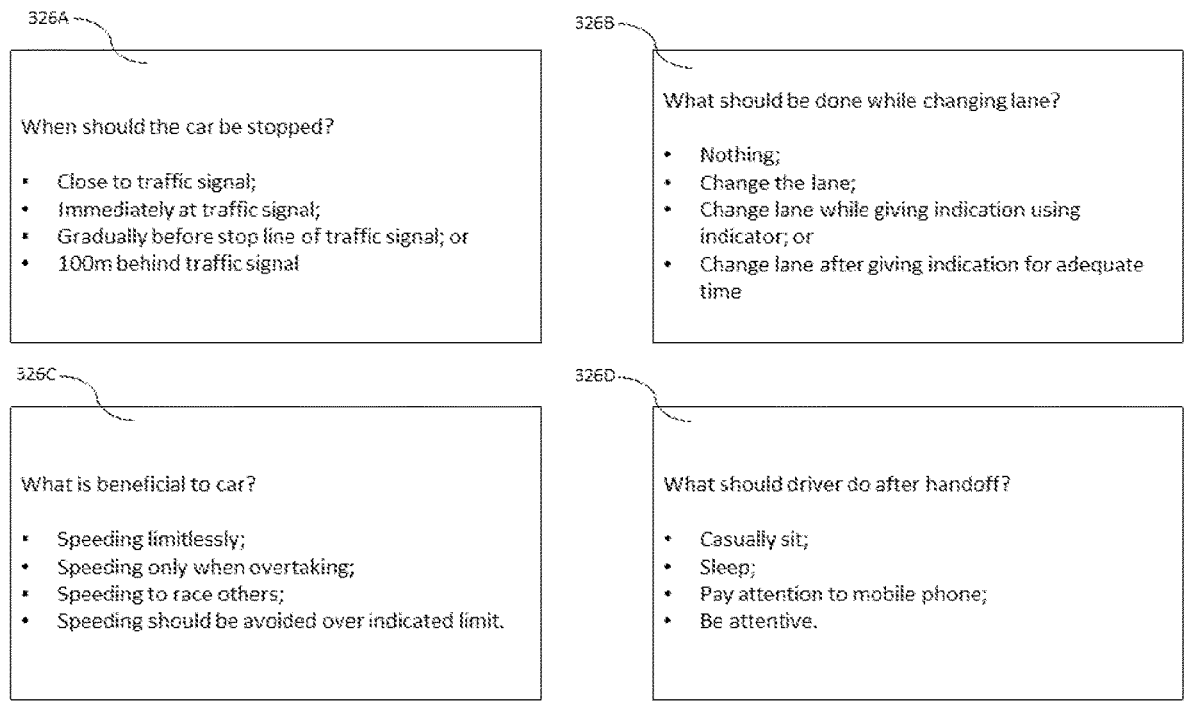
FIG. 3B is a block diagram of various screens of a vehicle infotainment system, in accordance with an embodiment of the invention.
Figure 3C:
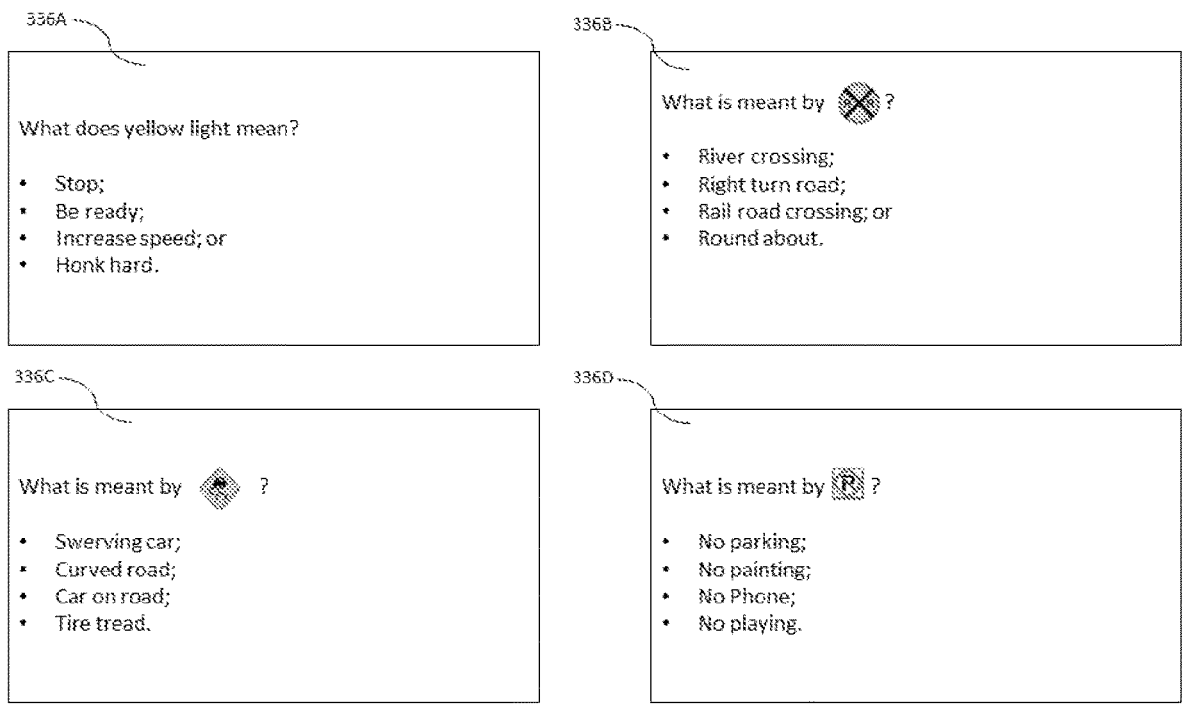
FIG. 3C is a block diagram of various screens of a vehicle infotainment system, in accordance with an embodiment of the invention.
Figure 3D:
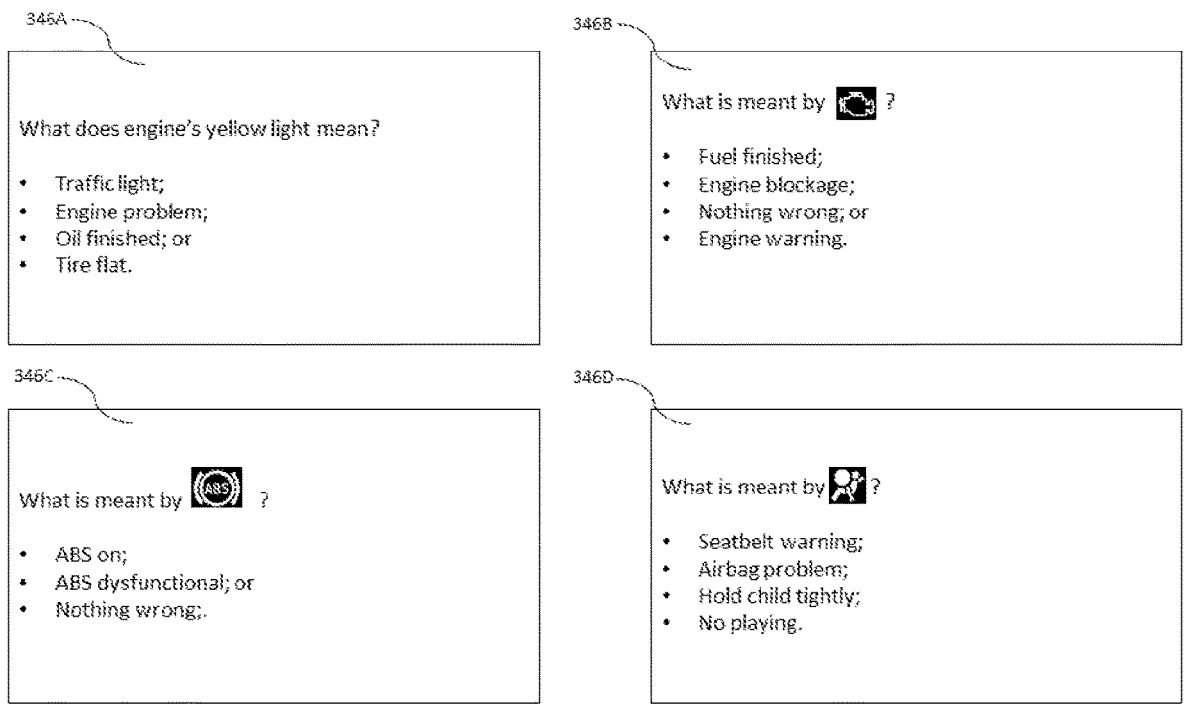
FIG. 3D is a block diagram of various screens of a vehicle infotainment system, in accordance with an embodiment of the invention.

FIGS. 3A, 3B displays multiple displays displaying various kinds of questions that may be provided to the driver.

Figure 4:
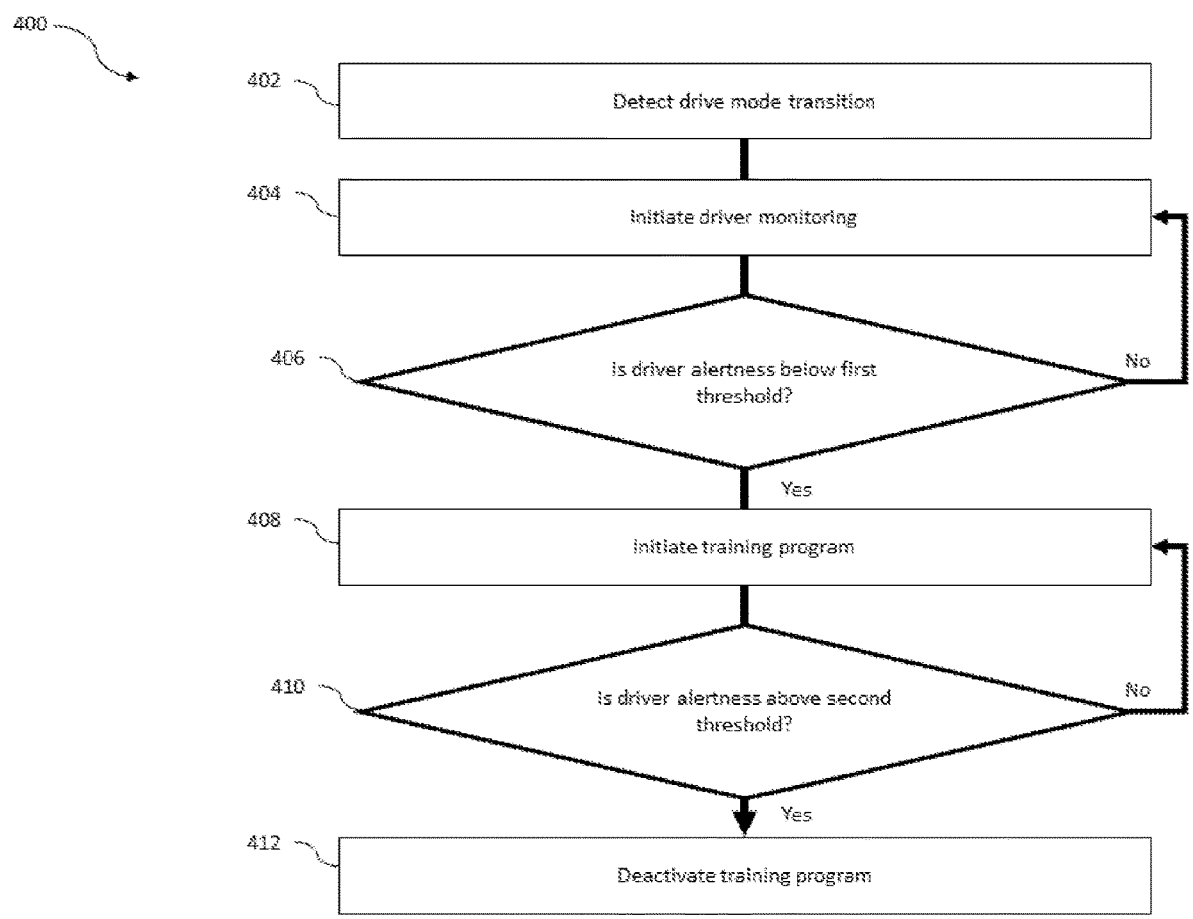
FIG. 4 is flow chart depicting an overall method of engaging driver during an autonomous mode, in accordance with an embodiment of the invention.

FIG. 4 is a flow chart of a method 400 for engaging the driver during an active autonomous drive mode of the vehicle. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

At step 402, a drive mode transition is detected. The drive mode may be changed to autonomous from manual driving mode. The transition may be driver initiated or initiated by the processing module 310 itself. The automatic transition may be based on the traffic predictions, road condition predictions that the processing module 310 may request from and receive from the central server. After determination of the drive mode transition, at step 404, driver monitoring is initiated. The driver monitoring may utilize cameras to take continuous footage of the driver and capture information from eyes of the driver. At step 406, it is determined, whether the alertness of the driver is below a first threshold or not. If the alertness of the driver is not below the first threshold, then the method 400, moves back to step 404. However, if the alertness level of the driver falls below the first threshold then at step 408, a training module 312 is activated that provides an interactive training program to the driver. Details of the training program have been described earlier. At step 410, that may also be simultaneously while the training program is being displayed, the alertness level of the driver is checked by comparing it to a second threshold. If the alertness level is still below the second threshold level, then the method 400 goes back to step 408. However, if the alertness level of the driver is equal or greater than the second threshold level, then at step 412 the training module 312 is deactivated.

It will be appreciated that, for clarity purposes, the above description has described embodiments of the present subject matter with reference to different functional units and processors. However, it will be apparent that any suitable distribution of functionality between different functional units, processors or domains may be used without detracting from the present subject matter.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

We claim:

1. A device (300) for engaging a driver during an autonomous mode comprising:
    a drive mode monitoring module (302) configured to detect a transition from a manual drive mode to an autonomous drive mode;
    a driver monitoring module (304) to monitor driver alertness during the autonomous drive mode; and
    an interactive module (314), further comprising;
        a processing module (310) configured to activate an interactive training program in case alertness of the driver falls below a first threshold value wherein the first threshold value for alertness is determined based on plurality of attributes, wherein further the interactive training program is deactivated if the alertness of the driver is equal or greater than a second threshold value;
        a training module (312) configured to receive activation or deactivation instructions from the processing module (310).

2. The device (300) as claimed in claim 1, wherein the plurality of attributes is condition of road, traffic conditions, atmospheric conditions.

3. The device (300) as claimed in claim 1, wherein the interactive training program enhances driving shortcomings of the driver identified by the processing module (310).

4. The device (300) as claimed in claim 3, wherein the shortcomings of the driver are determined based on a comparison between driving behavior of the driver that is continuously monitored and optimal driving behavior corresponding to other drivers stored in a database.

5. The device (300) as claimed in claim 1, wherein the interactive training program enhances traffic rule knowledge of the driver.

6. The device (300) as claimed in claim 5, wherein the traffic rule knowledge of the driver is determined based on a violations of traffic rules determined by the processing module (310).

7. The device (300) as claimed in claim 1, wherein the interactive training program enhances a vehicle operation error knowledge of the driver.

8. The device (300) as claimed in claim 7, wherein the vehicle operation error rule knowledge of the driver is determined based on a vehicle operational issues faced by the driver in past or by other vehicle drivers in general.

9. A method for engaging a driver during an autonomous drive mode comprising:
   detecting a transition from a manual drive mode to the autonomous drive mode;
   monitoring driver alertness during the autonomous drive mode;
   activating an interactive training program in case alertness of the driver falls below a first threshold value wherein the first threshold value for alertness is determined based on plurality of attributes, wherein further the interactive training program is deactivated if the alertness of the driver is equal or greater than a second threshold value.

10. The method as claimed in claim 9, wherein the plurality of attributes is condition of road, traffic conditions, atmospheric conditions.

11. The method as claimed in claim 9, wherein the interactive training program enhances driving shortcomings of the driver identified by a processing module (310).

12. The method as claimed in claim 11, wherein the shortcomings of the driver are determined based on a comparison between driving behavior of the driver that is continuously monitored and optimal driving behavior corresponding to other drivers stored in a database.

13. The method as claimed in claim 9, wherein the interactive training program enhances traffic rule knowledge of the driver.

14. The method as claimed in claim 13, wherein the traffic rule knowledge of the driver is determined based on a violations of traffic rules determined by a processing module (310).

15. The method as claimed in claim 9, wherein the interactive training program enhances a vehicle operation error knowledge of the driver.

16. The method as claimed in claim 15, wherein the vehicle operation error rule knowledge of the driver is determined based on a vehicle operational issues faced by the driver.

* * * * *